March 19, 1957   W. W. CHEW   2,786,007
METHOD OF MAKING ONE-PIECE HOLLOW BOOT-LASTS
Filed July 16, 1954

Inventor
Wilson W. Chew
by Roberts Cushman Grover
Att'ys

United States Patent Office 2,786,007
Patented Mar. 19, 1957

2,786,007

METHOD OF MAKING ONE-PIECE HOLLOW BOOT-LASTS

Wilson W. Chew, Barrington, R. I., assignor to Marbill Company, Providence, R. I., a corporation of Rhode Island Application July 16, 1954, Serial No. 443,765

8 Claims. (Cl. 154—83)

This invention relates to the manufacture of hollow articles, for example, lasts such as are used in the manufacture of rubber footwear and more particularly to a novel method of making one-piece hollow lasts of a non-metallic material which is impervious to moisture, and which are substantially as strong and rigid as the customary metal lasts employed for the purpose, but which are more resistant to corrosion from chemical action and also less subject to chipping as the result of exposure to sharp blows. A further and very valuable characteristic of a last made of such a material is that, by the use of such a last, vulcanization of a rubber boot on such a last can be accomplished by passing the lasted boot through a high-frequency electrical field whereby vulcanization can be completed in a fraction of the usual required time, a process which cannot be practiced by the use of metal or wooden lasts.

In the production of rubber footwear the last remains within the shoe or boot from the earliest stages in the operation until the boot is substantially complete. Thus, in a factory of substantial size, a great many lasts are required and as these lasts, as customarily made, are quite expensive, the maintenance of a sufficient stock of lasts in the various sizes and styles required represents a very substantial capital investment. The present invention has for one of its objects the provision of a novel method of preparing lasts such that the resultant last, although having all of the desired characteristics from the standpoint of the footwear manufacturer, may be made more cheaply and expeditiously than customary lasts. A further object is to provide a method of making hollow lasts such that it is no longer necessary to resort to the high temperatures required for the melting of the metal used in making the customary metallic lasts. A further object is to provide a method of making lasts which may be carried out by persons relatively unskilled in foundry practice. A further object is to provide a practical method of making a non-metallic, moisture impervious last of a kind which can be employed in the treatment of the lasted shoe or boot by means of a high-frequency electrical field. Other and further objects and advantages of the invention will be pointed out in the following more detailed description and by reference to the accompanying drawings, wherein Fig. 1 is a diagrammatic side elevation of an ordinary wood or metal last such as is used in the manufacture of rubber footwear and which is used in the practice of the present invention as a pattern from which any desired number of replicas may be produced;

Figure 1:
Figure 3:
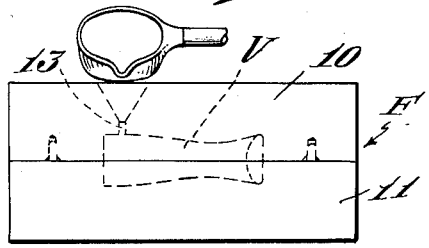
Fig. 3 is a side view of the same flask as shown in Fig. 2, but with the last removed and illustrating the step of filling the resultant mold cavity with a suitable fluid material to form a casting.

Referring to the drawings, the letter L indicates a last of wood or metal such as is customarily employed in the manufacture of footwear and which in accordance with the present invention would be of the exact external size and contour of the hollow lasts which are to be made. It will be understood that the last L as shown in Fig. 1 is merely by way of illustration, and that the last actually employed may have any surface configuration commonly found in lasts used in footwear manufacture. Having provided this last L, which in reality is a model, externally at least, of the hollow last which is to be made, this last is arranged in a molding flask F, here shown diagrammatically as a two-part flask comprising the top member or cope 10 and the bottom member or drag 11, the last L being embedded in a body of molding material indicated at 12, in a manner customarily employed in the making of castings in two-part molds, the molding material being of any desired type for example, sand, although preferably, a material like plaster-of-Paris which provides a very smooth surface may be employed. After the molding material has taken the external contour of the last L, the upper and lower parts of the flask are separated, the last L is withdrawn and the upper and lower parts of the flask are again assembled, thus providing a cavity V (Fig. 3) for the reception of a different type of molding material in liquid form which is poured into the cavity V through the sprue hole 13. This latter molding material should be of a nature such that at normal temperatures it is rigid and shape retaining and will retain these characteristics up to a temperature such as is required for curing the coating material hereinafter referred to. On the other hand, it should be capable of fusing and becoming liquid at a temperature below that which would injure the coating material after the latter has set. Various types of wax may be found which have these characteristics, but it is preferred to employ a metallic alloy because of its greater rigidity. Alloys comprising tin, lead and bismuth are well known which possess these characteristics and the further desirable characteristic of setting without substantial shrinkage. An alloy, for example, containing four parts of tin by weight, eight parts of lead, fifteen of bismuth and three of cadmium has a melting point of 150° F. Another alloy known as "bismuth solder" contains 24.8 parts of tin by weight, 22.1 parts of lead and 53.1 parts of bismuth, this alloy melting at 250° F. Other well known alloys of lead, tin and bismuth have fusing points varying from 204 to 450° F.

Figure 4:
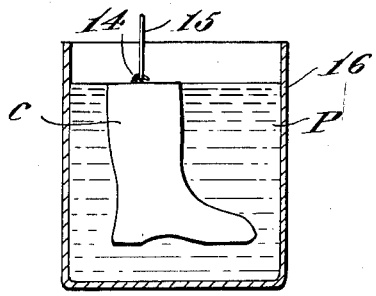
Fig. 4 is a diagrammatic vertical section showing a tank containing coating material and showing the hardened casting withdrawn from the flask of Fig. 3 and immersed in the coating material.
Figure 5:
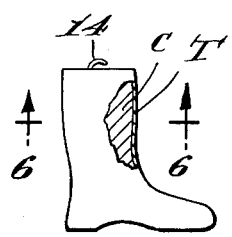
Fig. 5 is a side elevation, with parts broken away, showing the coated casting resultant from the operation of Fig. 4.
Figure 2:
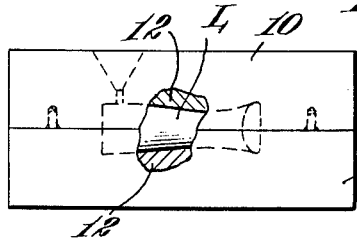
Fig. 2 is a diagrammatic side elevation, with parts broken away, of a two-part flask showing the last of Fig. 1 in position to constitute a core about which molding material has been placed.
Figure 6:
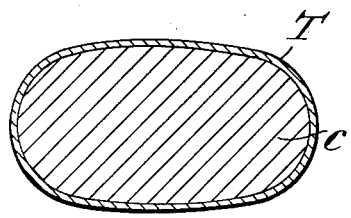
Fig. 6 is a diagrammatic transverse section, to larger scale, substantially on the line 6—6 of Fig. 5.
Figure 7:
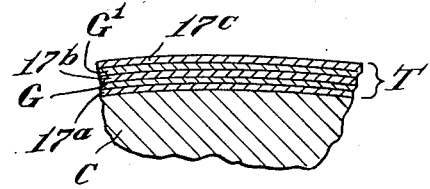
Fig. 7 is a fragmentary section on the same plane as Fig. 6, but to very much larger scale.
Figure 8:
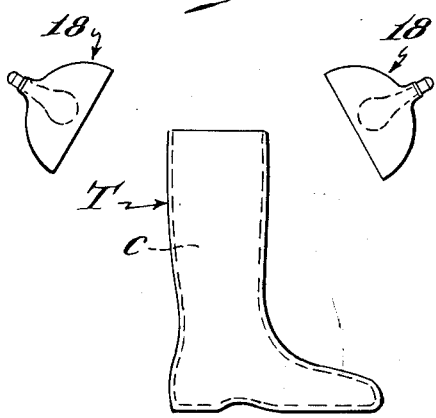
Fig. 8 is a diagrammatic side elevation illustrating the step of curing the coating material on the casting.

After the casting material has solidified, the resultant casting C, Fig. 5, is removed from the molding flask and its outer surface is smoothed off to remove any fins or remnants of the sprue and the top of the casting is then preferably provided with a hook 14 or similar device by means of which the casting may be attached to a dipping rod 15, Fig. 4. Having attached the casting to a dipping rod or equivalent device, the casting is then lowered into a body of liquid coating material P contained in a suitable receptacle 16. One material desirable to form the coating is a semi-liquid mixture of polyester resin and benzoate peroxide. The casting C may be completely immersed in the coating material or it may be only partially immersed, dependent upon whether the entire outside surface of the casting C is to receive the coating or whether only a portion of it is to receive the coating. As shown in Fig. 4, the casting is immersed to the level of its top surface. After the casting has thus been dipped, it is removed from the receptacle 16 and, as shown in Fig. 5, carries with it a coating of the material P forming the external layer T. As illustrated in Figs. 5 and 6, this layer T is shown as a single ply and if the coating material employed be of the proper kind and consistency, for example, if it contains short glass fibers intermingled with the plastic, such a single ply layer may suffice. However, according to a preferred procedure, after this first coating has partially set so as to become gel-like in consistency, there is applied to this coating, so as to adhere thereto, a layer of fiber glass, either in mat form or in the form of loose fibers. If desired, after this fiber glass has been applied, the casting C may again be dipped in the plastic material, and this sequence of operations may be repeated as many times as desired to provide a coating T of the desired thickness. Thus for example, as shown in Fig. 7, the coating T comprises a first layer $17^a$ of plastic, then a layer G of fiber glass, then a second layer $17^b$ of plastic, then a second layer $G^1$ of fiber glass and then a third layer $17^c$ of plastic. In any event, it is desirable to provide a coating T, regardless of the number of its constituent layers, which, in the completed article, will be of the order of one-eighth of an inch in thickness. Having provided the casting with this coating T comprising plastic and fiber glass, the casting is now exposed to conditions such as to cure the plastic constituent of the coating for example, by placing it in an oven or by exposing it to infrared lamps 18, as suggested in Fig. 8.

Figure 9:
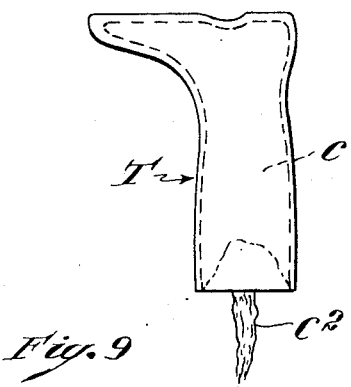
Fig. 9 is a diagrammatic side elevation showing the coated casting inverted and illustrating the step of pouring out the melted material of the casting leaving the hollow last completed except for external finishing operations.

The curing temperature to which the casting with its coating T is thus subjected must be below that at which the material of the casting C will melt. However, for the proper curing of the plastics such as above referred to, temperatures between 125 and 130° F. are sufficient, which are well below the temperature of fusion of such metallic alloys as above suggested. If, in the dipping operation, the coating material was permitted to cover the top surface of the casting C, a portion of this top part of the coating should be removed, preferably before the curing operation is begun. The exposure of the casting with its coating to the curing temperature is maintained for a period sufficient to insure a sufficient curing of the coating so that it will properly retain its shape and then, by means of the same heating apparatus, if desired, the temperature is increased up to that at which the material forming the casting C melts, but below that which would injure the coating. This latter heating will complete the curing if not previously completed. The assembly is then inverted, as shown in Fig. 9, allowing the melted material of the casting to run out through the opening in the coating at the top of the assembly, thus leaving a hollow last which, externally, is of the exact contour and size of the last L which was used as the model but which is hollow and has a wall thickness which, as above suggested, may not exceed one-eighth of an inch.

It is thus possible to produce hollow lasts which are light in weight, which are exceedingly strong and durable and not subject to chipping and which at the same time are inert to the chemicals employed in the manufacture of footwear. Moreover, because the material is impervious to moisture and does not become hot when exposed to a high-frequency electrical field, the last may be used for the after-lasting treatment of leather footwear, or in the vulcanization of rubber footwear, by exposure to such a field (which has many practical advantages) whereas wooden or metal lasts cannot be so employed.

While as above described, the dipping of the casting C is indicated as a manual operation, it is obvious that this dipping may be carried out mechanically and that a large number of castings may be dipped at the same time. It is further to be noted that because the material which forms the casting C is melted and removed from the coating T which forms the completed last, this casting material is available for re-use as often as desired.

It is further manifest that, if desired, such elements as metal last pins, inserts, etc. may be placed at the desired points on the casting C before the latter is dipped so that they will be incorporated in the coating T and thus become integral parts of the completed hollow last.

While one desirable procedure has been suggested in the practice of the present process, it is to be understood that the process is inclusive of all modifications as to sequence of steps or materials employed such as may fall within the scope of the appended claims.

I claim:

1. That method of making a one-piece hollow last for use in footwear manufacture which comprises as steps providing a cast of the last to be made, the cast being of a material which is normally rigid and shape-retaining at normal temperatures but which fuses at a temperature below 360° F., coating the bottom and sides at least of the cast with a polyester resin in semi-liquid condition the coating being applied by dipping the cast in a body of the semi-liquid resin, allowing the coating partially to gel, embedding fiber glass in the coating, curing the coating at a temperature below that which would fuse the cast, and then heating the assembly sufficiently to fuse the cast and withdrawing the fused material which formed the cast from the interior of the cured coating thereby providing the desired hollow last.

2. That method of making a one-piece hollow last according to claim 1, which comprises the further step of applying another coating of the resin so as to cover the fiber glass before subjecting the assembly to the curing operation.

3. That method of making a one-piece hollow last according to claim 1, wherein the coating is cured by exposing the assembly to a temperature between 125 and 130° F.

4. That method of making a one-piece hollow last according to claim 1, wherein the material which forms the cast is a low melting point metal alloy comprising a substantial percentage of bismuth.

5. That method of making a one-piece hollow last according to claim 1, wherein the coating is first applied by dipping the cast into a body of the selected plastic in fluid condition thereby to form a coating on the surface of the cast, causing said coating to gel, then applying a mat of fiber glass to the gelled coating, then again dipping the last in the liquid plastic to apply another layer of the plastic thereto, and then curing the plastic so as to embed the fiber glass therein.

6. That method of making a one-piece hollow last according to claim 1, wherein the coating is formed by applying alternating layers of liquid plastic and fiber glass to the surface of the cast thereby building up a composite coating of the order of ⅛ inch in thickness, the liquid plastic being caused to gel before the application of the fiber glass, curing the coating at a temperature below the melting point of the material of the cast; then subjecting the cured coating and cast to a temperature such as to melt the material of the cast, and removing the molten material from within the cured coating.

7. That method of making a one-piece hollow last for use in footwear manufacture, the wall of the desired last comprising fiber glass embedded in synthetic resin, said method comprising as steps providing a cast of the last which is to be made and which is of a material which is rigid and shape-retaining at the temperature requisite for curing the resin, but which melts at a temperature below that which would injure the cured resin, dipping the last in a liquid coating compound comprising the selected synthetic resin having glass fibers suspended therein thereby forming a coating on the outer surface of the cast, the coating being of approximately the thickness of the wall of the desired last, curing the coating and thereafter heating the cast to a temperature such as to liquefy it, and removing the molten cast material from the cured coating.

8. That method of making a one-piece hollow last for use in footwear manufacture which comprises providing a form whose exterior contour and shape is like that of the last to be made, employing said form as a pattern in molding a cast consisting of a metal alloy which is rigid at least up to a temperature of 130° F. but which melts and becomes fluid at a temperature not exceeding 360° F., applying a coating to the exterior of said cast by first dipping the cast into a body of polyester resin in liquid form, withdrawing the cast from the liquid and causing the layer of resin on the cast to gel, applying fiber glass to the gelled resin, and repeating the above operation until a coating of the order of ⅛ inch in thickness has been deposited on the cast, curing the coating at a temperature below the fusing point of the metal of the cast, and thereafter subjecting the cast to a temperature such as to melt it, and then removing the molten cast material from the cured coating.

References Cited in the file of this patent

UNITED STATES PATENTS

| | | |
|---|---|---|
| 910,370 | Gleason | Jan. 19, 1909 |
| 1,135,962 | Aylsworth | Apr. 13, 1915 |
| 1,343,191 | Allcutt | June 15, 1920 |
| 1,472,256 | Stringfield | Oct. 30, 1923 |
| 1,544,930 | Pack | July 7, 1925 |
| 1,776,622 | Errington et al. | Sept. 23, 1930 |
| 2,247,818 | Nast | July 1, 1941 |
| 2,354,110 | Ford et al. | July 18, 1944 |
| 2,385,718 | Menking | Sept. 25, 1945 |
| 2,534,617 | Mohrman | Dec. 19, 1950 |
| 2,683,100 | Edgar et al. | July 6, 1954 |

OTHER REFERENCES

Modern Plastics, "Air Ducts on the B-29," August 1945, pp. 136–140.